US012653338B2

(12) United States Patent
Zhao et al.

(10) Patent No.:  US 12,653,338 B2
(45) Date of Patent:  Jun. 16, 2026

(54) BEVERAGE SYSTEM FOR PROVIDING A COLD BEVERAGE

(71) Applicant: SOCIETE DES PRODUITS NESTLE S.A., Vevey (CH)

(72) Inventors: Lily Zhao, Shanghai (CN); Ruguo Hu, Shanghai (CN)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 15/119,187

(22) PCT Filed: Feb. 28, 2014

(86) PCT No.: PCT/CN2014/072723
§ 371 (c)(1),
(2) Date: Aug. 16, 2016

(87) PCT Pub. No.: WO2015/127654
PCT Pub. Date: Sep. 3, 2015

(65) Prior Publication Data
US 2017/0035236 A1      Feb. 9, 2017

(51) Int. Cl.
A47J 31/40        (2006.01)
A47J 31/00        (2006.01)
(Continued)

(52) U.S. Cl.
CPC ............. A47J 31/407 (2013.01); A47J 31/00 (2013.01); B67D 1/0855 (2013.01);
(Continued)

(58) Field of Classification Search
CPC ... B60Q 1/0041; B60Q 1/0683; F21S 41/295; F21S 41/39; F21S 43/50; F25D 31/002;
(Continued)

(56) References Cited

U.S. PATENT DOCUMENTS

| | | | | |
|---|---|---|---|---|
| 3,540,629 A | * | 11/1970 | William, Jr. .......... | A47J 31/005 219/202 |
| 4,471,631 A | * | 9/1984 | Anstey .................. | F25D 31/002 62/177 |

(Continued)

FOREIGN PATENT DOCUMENTS

| | | | | |
|---|---|---|---|---|
| AL | 2642906 | * | 11/2011 | .............. A47J 31/54 |
| CN | 2792368 Y | | 7/2006 | |

(Continued)

OTHER PUBLICATIONS

EP 2,642,906 translation.*

(Continued)

*Primary Examiner* — Bryan Kim
(74) *Attorney, Agent, or Firm* — K&L Gates LLP

(57) ABSTRACT

A beverage system for providing a cold beverage is disclosed that includes a water supply unit for providing water, cooling means arranged downstream of the water supply unit 100, dispensing means for dispensing a beverage arranged downstream of the cooling means, valve means arranged downstream of the cooling means and upstream of the dispensing means, and a control module adapted to operate the valve means. A beverage machine that includes the beverage system and methods for using the beverage machine are also disclosed.

16 Claims, 3 Drawing Sheets

(51) Int. Cl.

| | |
|---|---|
| *B67D 1/08* | (2006.01) |
| *F25B 25/00* | (2006.01) |
| *F25B 49/02* | (2006.01) |
| *F25D 11/00* | (2006.01) |
| *F25D 29/00* | (2006.01) |
| *F25D 31/00* | (2006.01) |

(52) U.S. Cl.

CPC ......... *B67D 1/0858* (2013.01); *B67D 1/0859* (2013.01); *B67D 1/0888* (2013.01); *F25B 25/005* (2013.01); *F25B 49/02* (2013.01); *F25D 11/00* (2013.01); *F25D 29/00* (2013.01); *F25D 29/008* (2013.01); *F25D 31/002* (2013.01); *F25B 2600/111* (2013.01); *F25B 2700/21173* (2013.01); *F25D 2700/14* (2013.01); *F25D 2700/16* (2013.01)

(58) Field of Classification Search

CPC .. B67D 1/0857; B67D 1/0858; B67D 1/0859; B67D 1/0861; B67D 1/0862; B67D 1/0864; B67D 1/0865; B67D 1/0867; B67D 1/0868; B67D 1/0869; A47J 31/469

See application file for complete search history.

(56) References Cited

U.S. PATENT DOCUMENTS

| | | | | |
|---|---|---|---|---|
| 4,915,261 | A * | 4/1990 | Strenger | A47J 31/407 |
| | | | | 222/107 |
| 8,515,267 | B2 * | 8/2013 | Boussemart | A47J 31/545 |
| | | | | 392/479 |
| 9,410,728 | B2 * | 8/2016 | Lee | F25B 49/02 |
| 9,723,945 | B2 * | 8/2017 | Mulder | A47J 31/5253 |
| 2008/0041236 | A1 * | 2/2008 | Raouf | A47J 31/401 |
| | | | | 99/323.3 |
| 2010/0300302 | A1 | 12/2010 | Kooijker et al. | |
| 2013/0259995 | A1 * | 10/2013 | Porzio | A47J 31/002 |
| | | | | 426/433 |
| 2013/0337120 | A1 * | 12/2013 | Sabates, III | B01D 5/0006 |
| | | | | 99/279 |
| 2014/0069353 | A1 * | 3/2014 | Jimenez | A47J 31/56 |
| | | | | 99/283 |

FOREIGN PATENT DOCUMENTS

| | | | |
|---|---|---|---|
| CN | 101166424 | A | 4/2008 |
| CN | 101346085 | A | 1/2009 |
| CN | 101657130 | A | 2/2010 |
| CN | 201436955 | U | 4/2010 |
| CN | 101842037 | A | 9/2010 |
| CN | 202027415 | U | 11/2011 |
| CN | 102342752 | A | 2/2012 |
| CN | 202820961 | U | 3/2013 |
| CN | 103220949 | A | 7/2013 |
| CN | 103298381 | A | 9/2013 |
| EP | 1510499 | A1 | 3/2005 |
| WO | 2009057037 | A1 | 5/2009 |
| WO | 2012069958 | A1 | 5/2012 |
| WO | 2013041581 | A1 | 3/2013 |

OTHER PUBLICATIONS

Engineering Toolbox NPL, published May 8, 2006, https://web.archive.org/web/20060508170309/https://www.engineeringtoolbox.com/refrigerants-d_902.html (Year: 2006).*

Thermopedia NPL, published Apr. 10, 2012, https://web.archive.org/web/20120410211055/https://www.thermopedia.com/content/832/ (Year: 2012).*

European Search Report dated Sep. 26, 2017, in EP14883907, filed Feb. 28, 2014.

International Search Report, mailed Nov. 26, 2014, in PCT/CN2014/072723, filed Feb. 28, 2014.

Written Opinion of the International Searching Authority, mailed Nov. 26, 2014, in PCT/CN2014/072723, filed Feb. 28, 2014.

CN Appl. No. 201480075619.7; Nestec S. A., filed Feb. 28, 2014; Office Action dated Sep. 5, 2018.

Chinese Office Action for Appl No. 202210313491.X dated Sep. 29, 2023.

* cited by examiner

BEVERAGE SYSTEM FOR PROVIDING A COLD BEVERAGE

CROSS REFERENCE TO RELATED APPLICATIONS/INCORPORATION BY REFERENCE STATEMENT

This application is a US national stage application filed under 35 USC § 371 of International Application No. PCT/CN2014/072723, filed Feb. 28, 2014. The entire contents of the above-referenced application are hereby expressly incorporated herein by reference.

BACKGROUND

1. Field of the Invention

The presently disclosed and/or claimed inventive concept(s) relates to a beverage system for providing a cold beverage, as well as to a beverage machine comprising such a beverage system and to a corresponding method for providing such a cold beverage.

2. Technical Background

From the prior art beverage machines are known for providing hot and/or cold beverages, wherein these beverage machines are usually bulky in size and often need to pre-cool and store the required water or beverage (e.g. orange juice) in a cold tank which makes the drink before service. Thus the cold water or beverage is stored for a long time and may lose its freshness before it is used for beverage preparation. Such a beverage machine is, for example, disclosed in document GB 889,134. Further beverage machines are known, for example, from documents US 2010/0139496 A1, US 2004/0187514 A1 and WO 2012/069958 A1. Document US 2010/0139496 A1 discloses a beverage device for providing a single or multiple flavored carbonated cold beverage. For cooling the beverage a chiller unit is provided comprising a thermoelectric cooling module. In document US 2004/0187514 A1 a method for regulating a refrigerant temperature of a beverage machine is disclosed comprising a compressor with adjustable compressor power for cooling the refrigerant.

Document WO 2012/069958 A1 discloses a just-in-time beverage device (i.e. the water is heated or cooled only once a beverage process is initiated such that there is no need to pre-cool the water in a tank) with heating/cooling means. In this respect, it is proposed to direct the water away from a dispenser unit as long as it does not have a predetermined temperature. Once the water has a predetermined temperature, flow controlled valve means direct the water to the dispenser unit.

In view of this prior art, it is an object of the presently disclosed and/or claimed inventive concept(s) to provide a new beverage system for providing a cold beverage. It is in particular an object of the presently disclosed and/or claimed inventive concept(s) to provide a new beverage system with which a fresh, cold beverage may be provided with varied temperatures and within short time. Moreover, a beverage system can be provided which can be easily programmed/amended for an optimal consumption of different kind of beverages (e.g. orange juice, hot or cold coffee, cocoa drinks, etc.). "Different kind of beverages" relates to the fact that the ingredients for the beverages, but also the ingredient/liquid interaction (e.g. brewing, dissolving, extracting, etc.) may differ between these beverages.

These and other objects which become apparent upon reading the following description are solved by the subject-matter of the independent claims. The dependent claims refer to particular (but non-limiting) embodiments of the presently disclosed and/or claimed inventive concept(s).

DETAILED DESCRIPTION

Figure 1:
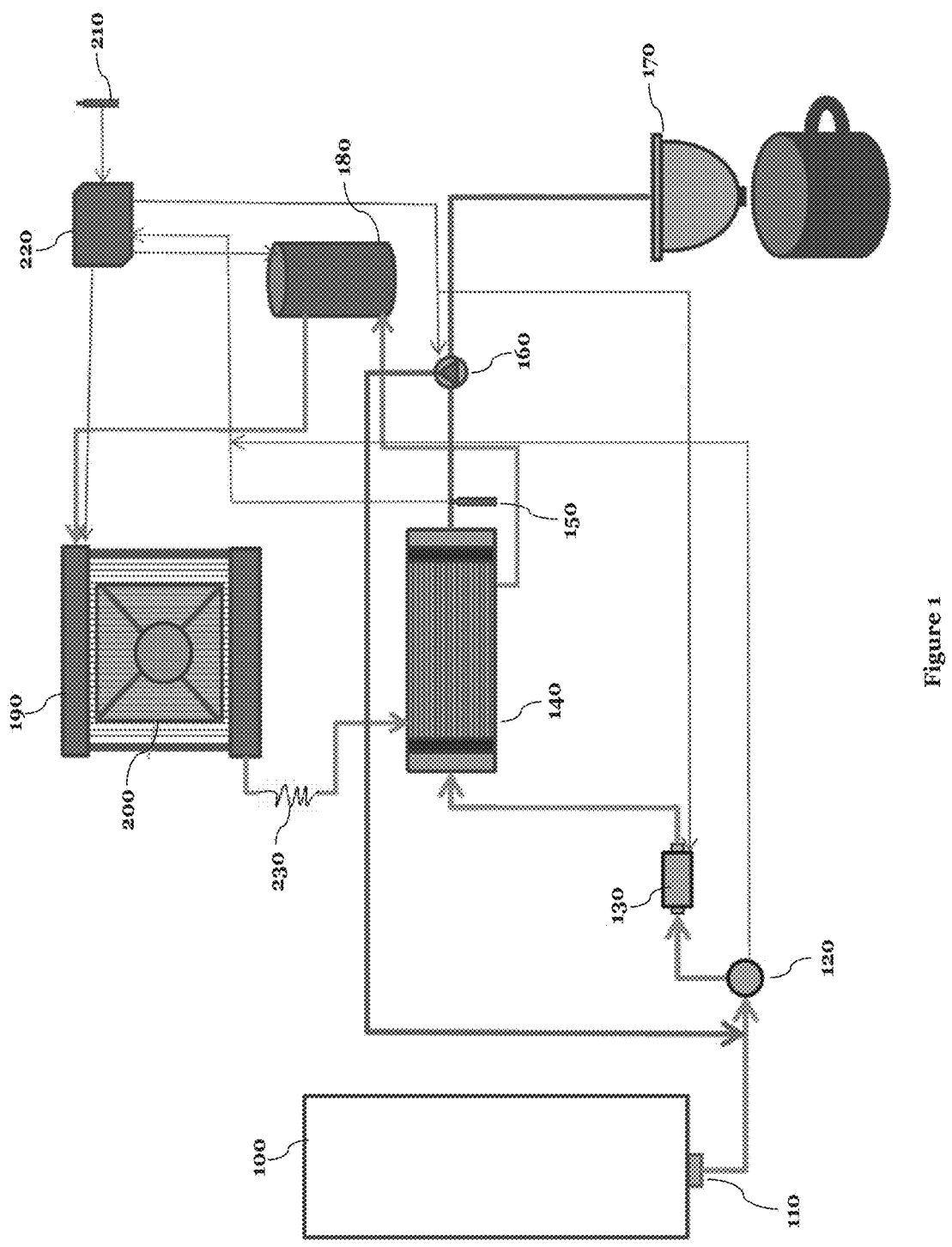
FIG. 1 is a schematic view of a beverage system constructed in accordance with the presently disclosed and/or claimed inventive concept(s)

According to the presently disclosed and/or claimed inventive concept(s), a beverage system for providing a cold beverage is provided comprising:

a water supply unit for providing water;

cooling means for cooling the water provided by the water supply unit, wherein the cooling means are arranged downstream of the water supply unit;

dispensing means for dispensing a beverage, wherein the dispensing means are arranged downstream of the cooling means;

valve means arranged downstream of the cooling means and upstream of the dispensing means, wherein the valve means are operable to direct water from the cooling means either in a loop back to the cooling means for a further cooling of the water or to the dispensing means for dispensing a cold beverage; and a control module adapted to operate the valve means.

According to the presently disclosed and/or claimed inventive concept(s), the water from the cooling means is directed in a loop back to the cooling means for further cooling of the water until it has a predetermined temperature. In this respect, in certain non-limiting embodiments, the temperature of the water downstream of the cooling means may be measured by means of a first temperature sensor arranged upstream of the valve means (which, in certain, non-limiting embodiments, may be arranged at a water outlet of the cooling means). Once the temperature of the cold water measured by the first temperature sensor reached a predetermined temperature/set-point (e.g. set in the control unit by a predetermined pattern or by a user), the control unit sends an output signal in order to activate the valve means to direct water from the cooling means to the dispensing means for dispensing a cold beverage.

Alternatively, the temperature of the water after the cooling means is not measured, but the control module is adapted to operate the valve means according to predetermined time patterns. Such predetermined time patterns can be stored in a memory of the control module, wherein the predetermined time patterns may be calculated based on former working cycles or can be calculated based on offline experiments, i.e. can be provided as stored program in the control unit. The time patterns are calculated such that it is ensured that the water temperature reaches the predetermined temperature/set-point.

The presently disclosed and/or claimed inventive concept(s) thereby allows the preparation of cold drinks rapidly and continuously with varied temperatures. Moreover, the beverage system according to the presently disclosed and/or claimed inventive concept(s) provides a cold beverage within a few seconds to less than 3 minutes such that the beverage system can provide real fresh cold beverages.

In certain non-limiting embodiments, the valve means may comprise at least one three-way valve adapted to direct water from the cooling means either in a loop back to the cooling means for a further cooling of the water or to the dispensing means for dispensing a cold beverage.

In certain non-limiting embodiments, the cooling means are provided by means of a cooling circuit comprising at least a condenser, a heat exchanger (e.g. a evaporator), a compressor, and a throttle device (e.g. a throttle valve or a capillary tube) arranged between the condenser and the heat exchanger, wherein in the cooling circuit 1, 1,1,2-Tetrafluoroethane ("R134a"), 2-Methylpropene ("R600a"), Propane ("R290"), Monochlorodifluoromethane ("R22") or Carbon Dioxide ("R744") or a mixture thereof is, in certain non-limiting embodiments, used as refrigerant.

In certain particular, non-limiting embodiments, the condenser and/or the heat exchanger may be a micro channel heat exchanger, a shell heat exchanger, a plate heat exchanger, a adiabatic real heat exchanger, a plate fin heat exchanger, a pillow plate heat exchanger, a face-change heat exchanger, a direct contact heat exchanger or a spiral heat exchanger and/or the compressor is a rotary compressor, an eccentric compressor, a distant compressor, or a linear compressor.

In a particular non-limiting embodiment, it may be desired to use a mini-compressor having dimensions suitable to use it in a compact beverage system having dimensions as commonly known from compact coffee machines (e.g. the Nestlé Dolce Gusto Coffee Machine). In practice, such a mini-compressor may have a height of about 7 cm and a base area of about 5×5 cm. In a particular, non-limiting embodiment, the electrical power consumption of the mini-compressor is between 115 and 500 W, having a cooling capacity between 200 and 1000 W (evaporating temp. 7.2° C., condensing temp. 45° C.), and the displacement is between 1.4 and 2.5 cc. Such mini-compressors have been tested and determined to provide a sufficient compressor power for a beverage system according to the presently disclosed and/or claimed inventive concept(s).

In certain non-limiting embodiments, the water supply unit comprises a water tank and/or connection means for connecting the beverage system to a water pipe.

In certain non-limiting embodiments, the beverage system further comprises a flowmeter for measuring the water flowrate, wherein the flowmeter is arranged downstream of the water supply unit and upstream of the cooling unit. In this respect, in certain non-limiting embodiments, a pump is arranged downstream of the flowmeter and adapted to provide an adjustable pump output. In the particular non-limiting embodiment of the beverage system comprising a flowmeter and a downstream arranged pump, it may be desired that the valve means (e.g. the three-way-valve) are operable to direct water from the cooling means to a position upstream of the flowmeter and downstream of the water supply unit.

In certain non-limiting embodiments, the control module is adapted to control the pump output of the pump dependent on the flowrate measured by the flowmeter, such as (but not limited to) wherein the control module is adapted to control the pump in such a way that a predetermined constant flowrate is provided. Moreover, in certain non-limiting embodiments, it may be desired that the control module is adapted to provide an alarm signal and/or the stop the beverage system, in case the flowmeter detects a flowrate below a predetermined minimum flowrate, such as (but not limited to) wherein the minimum flowrate is in a range between 80 ml/min and 250 ml/min, or a range between 100 ml/min and 200 ml/min, or wherein the predetermined minimum flowrate is 120 ml/min. Furthermore, it is generally desired (but non-limiting) that the minimum flowrate is below 120 ml/min. Thereby, it can be ensured that the beverage system is stopped before ice crystals are built in the heat exchanger (i.e. the evaporator) which could block the water flow and eventually break the water tubes.

In a particular, non-limiting embodiment, the compressor is adapted to provide adjustable compression power controlled by the control module. Thereby, the cooling capacity of the cooling means can be adjusted to a desired cooling level. Moreover, it may be desired (in certain non-limiting embodiments) that the condenser comprises ventilating means for cooling the refrigerant in the condenser, wherein the ventilation means are adapted to provide adjustable ventilation power controlled by the control module.

In certain non-limiting embodiments, the beverage system further comprises a second temperature sensor for measuring the environmental temperature, wherein the control module is adapted to control the compression power of the compressor and/or the ventilation power of the ventilating means dependent on the environmental temperature.

In a particular, non-limiting embodiment, the control module is adapted to reduce the compression power of the compressor and/or the ventilation power of the ventilating means in case the first temperature sensor detects a temperature below a predetermined minimum temperature, wherein the minimum temperature is, in certain non-limiting embodiments, in a range between 2° C. and 10° C., such as (but not limited to) between 4° C. and 7° C. or between 5° C. and 6° C. Thereby, it can be ensured that there is no freezing occurring in the heat exchanger forming ice inside the heat exchanger which can damage the cooling means and/or the tubes.

The presently disclosed and/or claimed inventive concept(s) further relates to a beverage machine comprising a beverage system according to the presently disclosed and/or claimed inventive concept(s). In this respect, it may be desired (in certain non-limiting embodiments) that the beverage machine comprises a brewing module adapted to receive a capsule and/or a pad containing the beverage ingredients required for a beverage preparation. Alternatively, the beverage machine may comprise a mixing chamber for receiving beverage ingredients, which in certain non-limiting embodiments is dosed from a storage reservoir. Notably, in certain non-limiting embodiments, a beverage machine according to the presently disclosed and/or claimed inventive concept(s) is adapted to provide a cold beverage as well as a hot beverage.

The presently disclosed and/or claimed inventive concept(s) further relates to a method for providing a cooled beverage, comprising the steps: providing a beverage machine as described above; inserting a capsule or a pad in a brewing module or filling beverage ingredients in a mixing chamber; determining a desired temperature of the cooled beverage; operating the valve means by the control module such that the water from the cooling means is either directed in a loop back to the cooling means for a further cooling of the water or to the dispensing means for dispensing a cold beverage. In this respect, it may be desired (in certain non-limiting embodiments) that the water from the cooling means is directed in a loop back to the cooling means as long as the first temperature sensor measures a temperature of the water above a predetermined temperature, wherein said predetermined temperature is, in certain non-limiting embodiments, between 17° C. and 7° C., such as (but not limited to) between 15° C. and 9° C. or between 11° C. and 13° C. Alternatively, the water from the cooling means is directed in a loop back to the cooling means for a predetermined period of time, wherein this predetermined period of time is, in certain non-limiting embodiments, between 3 and 40 seconds, such as (but not limited to) between 5 and 25 seconds or between 7 and 15 seconds.

In the following, the presently disclosed and/or claimed inventive concept(s) is described exemplarily with reference to the enclosed figures in which FIG. 1 is a schematic view of a beverage system according to the presently disclosed and/or claimed inventive concept(s).

The beverage system comprises a water tank 100 for providing water to the beverage system, wherein at an outlet 110 of the water tank 100 valve means for opening and closing the water tank 100 and/or a pump for pumping the water out of the water tank 100 may be arranged.

Downstream of the water tank 100 a flowmeter 120 is arranged for measuring the flowrate. Downstream of the flowmeter 120 a pump 130 is arranged, wherein the pump 130 is an adjustable pump (i.e. the pump can provide different pump outputs). The outlet of the pump 130 is connected to an intake of a heat exchanger (evaporator) 140 (in a particular, non-limiting embodiment a micro channel heat exchanger) for cooling the water from the water tank 100.

At an outlet of the heat exchanger 140, a first temperature sensor 150 is arranged for measuring the temperature of the water coming from the heat exchanger 140.

Downstream of the first temperature sensor 150, valve means are arranged, which are provided by means of three-way valve 160. The three-way valve 160 is connected to a dispenser module 170 and to a position upstream of the flowmeter 120.

According to the presently disclosed and/or claimed inventive concept(s), the three-way valve 160 is adapted to direct the water from the heat exchanger 140 either to the dispensing means 170 or to a position upstream of the flowmeter 120.

As can be taken from FIG. 1, the heat exchanger 140 is embedded in a cooling circuit further comprising a compressor 180, a condenser 190 and a throttle valve 230 arranged between the condenser 190 and the heat exchanger 140. The condenser 190 further comprises a ventilator 200 for cooling the refrigerant in the condenser 190, wherein the ventilator 200 is adapted to provide adjustable ventilation power (e.g. different rotation speeds). Instead of the throttle valve 230, a capillary tube may also be used as throttle device.

In a particular, non-limiting embodiment, the beverage system further comprises a second temperature sensor 210 for measuring the environmental temperature.

Finally, the beverage system comprises a control module 220. As can be taken from FIG. 1, the control module 220 is connected to the flowmeter 120, the pump 130, the first temperature sensor 150, the three-way valve 160, the compressor 180, the second temperature sensor 210 and to the ventilator 200.

Notably, the control module 220 receives input data from the flowmeter 120, the first temperature sensor 150 and from the second temperature sensor 210. Based on the data received from these inputs, the control module 220 can control the pump 130, the three-way valve 160, the compressor 180 and the ventilator 200 of the condenser 190. Moreover, it may be desired (in certain non-limiting embodiments) that the throttle valve 230, which is, in certain non-limiting embodiments, provided as an electronic expansion valve (or the capillary tube) can also be controlled by the control module 220.

In the following, a particular (but non-limiting) method for providing a cooled beverage by means of the beverage system is explained. At the beginning, a user inserts a capsule or a pad in a brewing module of a beverage machine comprising the above described beverage system.

Subsequently, a desired temperature of the cold beverage is determined, wherein the desired temperature may be chosen by the user (e.g. by input means of a control panel) or by reading the desired temperature from a barcode provided on the capsule or on the pad.

After the beverage making process has been initiated (e.g. by pressing a start button on the beverage machine), the control module 220 operates the pump 130 pumping water out of the water tank 100, wherein the water may be at ambient or tap water temperature in the water tank 100. During this step, the water flowrate is measured by the flowmeter 120 providing this data to the control unit 220.

Figure 2:
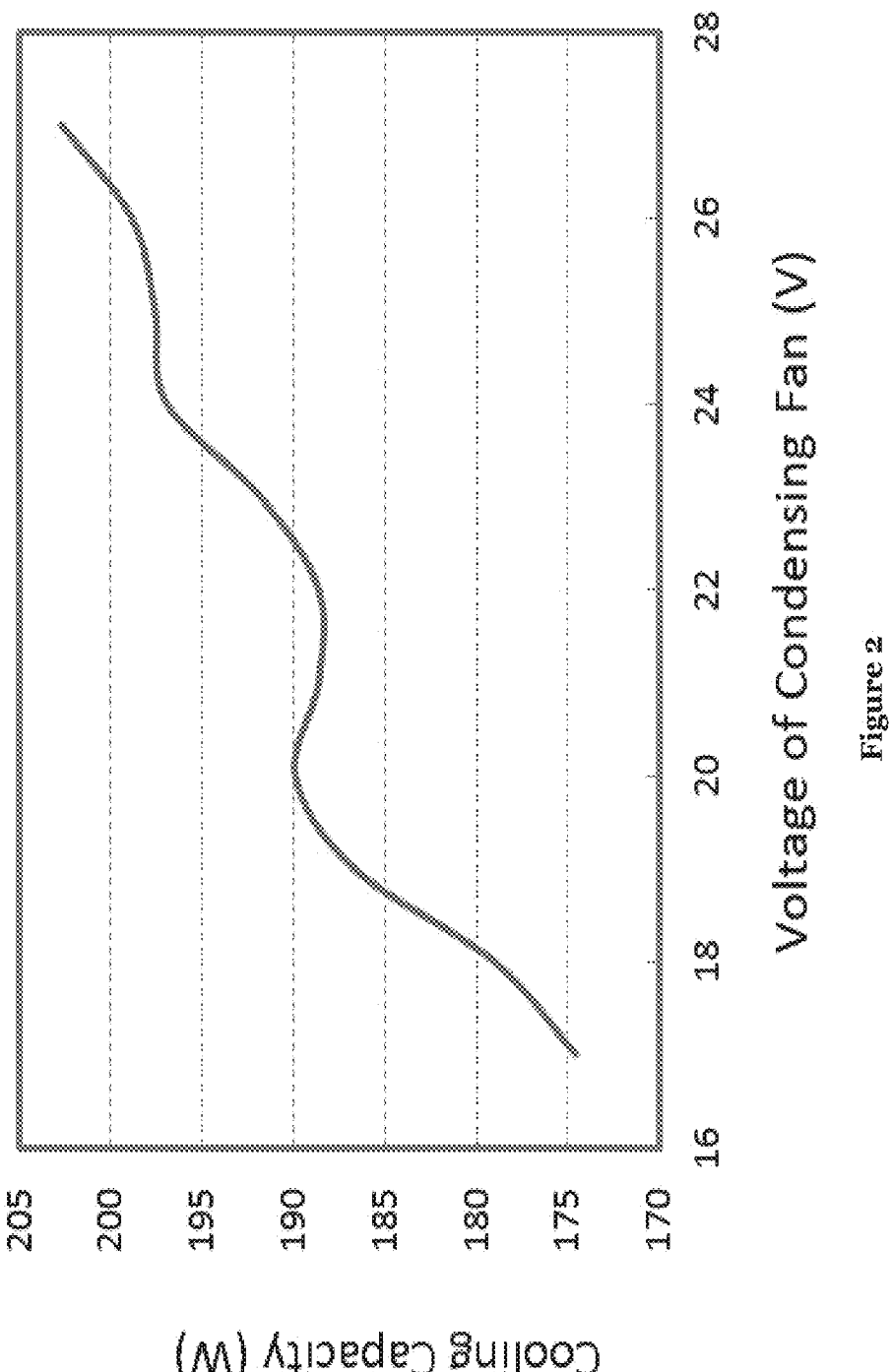
FIG. 2 is a diagram showing the relationship of the cooling capacity of the condenser and the voltage of a ventilation unit used for cooling the refrigerant in the condenser.

Downstream of the pump 130, the water enters into the heat exchanger 140 and the water is cooled down. In the cooling means, i.e. in the cooling circuit, the refrigerant circulates from the heat exchanger 140 to the compressor 180 where the refrigerant is liquefied under pressure and its temperature is risen. Then the pressurized refrigerant is cooled down by the condenser 190, i.e. by means of the ventilator 200. In a particular, non-limiting embodiment, the rotation speed of the ventilator 200 is adjustable by the control module 220 so that the heat exchange efficiency can be adjusted to a desired level corresponding to the cooling capacity. In other words, the control module 220 controls the input voltage of the ventilator 200, thereby changing the rotation speed of the ventilator 200, wherein a higher rotation speed of the ventilator 200 provides a lower refrigerant temperature. As a result, a higher cooling power can be provided in the heat exchanger 140. In FIG. 2 the relationship of the input voltage of the ventilator 200 and the cooling capacity of the heat exchanger 140 is exemplarily shown.

After the water leaves the heat exchanger 140, the temperature of the cooled water is measured by the first temperature sensor 150 providing this data to the control module 220.

Based on the water temperature measured by the first temperature sensor, the control module 220 controls the three-way valve 160 in such a way that the water is directed in a loop back to a position upstream of the flowmeter 120 such that the water can reenter into the heat exchanger 140 for a further cooling the water.

Once the first temperature sensor 150 measures that the water has a predetermined temperature/set point (e.g. 12° C.), the control module 220 operates the three-way valve 160 in such a way that the water is now directed to the dispensing means 170 (i.e. not in a loop back to the heat exchanger 140 anymore).

Alternatively, the control module 220 operates the three-way valve 160 in such a way that after a predetermined period of time, the water is directed to the dispensing means 170 (i.e. independent from any temperature measurement by the first temperature sensor 150 which is not necessary in this embodiment). Notably, the predetermined period of time may be calculated based on data derived from former working circles or from offline experiments pre-programmed in the control module 220.

Notably, the parts controlled by the control module 220 (i.e. the pump 120, the three-way valve 160, the compressor 180, the ventilator 200 and/or the throttle device 230) can be controlled according to predetermined patterns, and in certain non-limiting embodiments, calculated on data derived from former working circles or from offline experiments pre-programmed in the control module 220.

In a particular, non-limiting embodiment of the beverage system, the cooling circuit (i.e. the rotation speed of the ventilator 200 and the compression power of the compressor 180) is controlled dependent on the environmental temperature measured by means of the second temperature sensor 210. In case the environmental temperature is higher than a predetermined value (e.g. 25° C.), the control module 220 controls the compressor 180 such that a higher cooling power can be provided by the cooling circuit (e.g. by changing the motor driven frequency of the compressor 180). Alternatively, or in addition, the control module 220 can control the ventilator 200 in such a way that the input voltage of the ventilator 200 is changed, thereby changing the rotation speed of the ventilator 200. As explained above, higher input voltage leads to a higher rotation speed of the ventilator 200, thereby increasing the cooling power of the cooling circuit.

Figure 3:
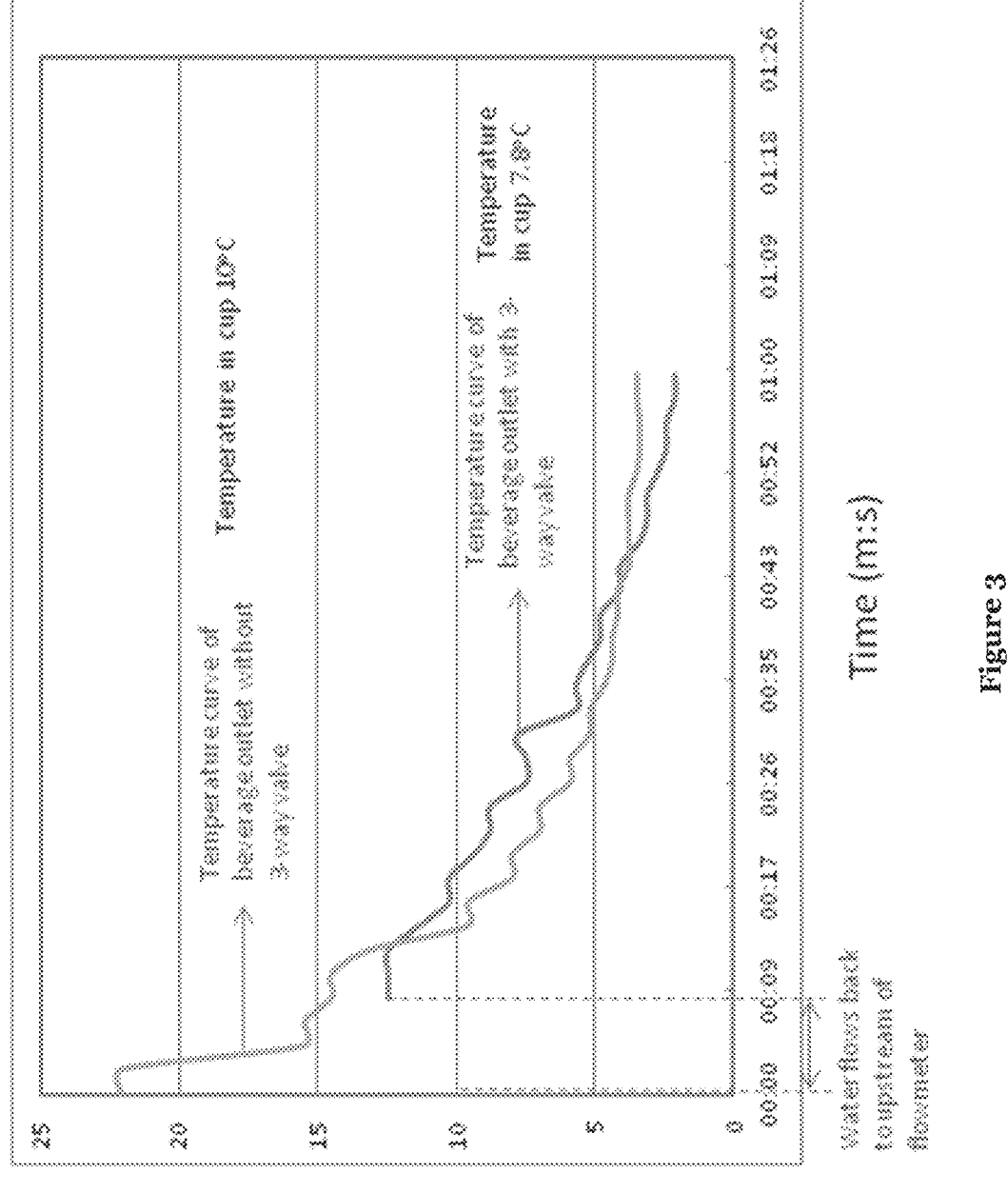
FIG. 3 is a diagram showing a temperature curve of a cold beverage.

As can be taken from FIG. 3, two temperature curves of the beverage at the beverage outlet are shown, namely a first temperature curve without looping the water back for a further cooling in the heat exchanger 140 and a second temperature curve with looping the water back for further cooling the water in the heat exchanger 140.

In the example with looping the water back to the heat exchanger, the water is looped back at a position upstream of the flowmeter 120 (cf. FIG. 1) for about 8 seconds, until the water has a temperature of about 12.5° C. (measured by means of the first temperature sensor 150).

As indicated in FIG. 3, without looping back the water for a further cooling in the heat exchanger 140, the beverage has a final temperature of about 10° C. Looping back the water for about 8 seconds can decrease the final temperature of the beverage to 7.8° C.

In this respect, it may be desired in certain non-limiting embodiments (dependent on the desired final temperature of the beverage) to loop back the water as long as the temperature of the water is above between 17° C. and 7° C., such as (but not limited to) between 15° C. and 9° C. or between 11° C. and 13° C. (measured with the first temperature sensor 150).

Alternatively, in particular in an embodiment without a first temperature sensor 150, the water is directed in a loop back to the heat exchanger 140 for a predetermined period of time, wherein the period of time is, in certain non-limiting embodiments, between 3 and 40 seconds, such as (but not limited to) between 5 and 25 seconds or between 7 and 15 seconds.

In a particular, non-limiting embodiment, in case the flowrate is not stable as measured by the flowmeter 120, the control module 220 controls the pump 130 to change the pump power (e.g. by changing the pump frequency of the pump 130) ensuring that the flowrate remains essentially constant.

Alternatively or in addition, the control module 220 changes the 3-way-valve position directing the water in a loop back in order to provide a stable/minimum flowrate. In this respect, a predetermined minimum value of the flowrate can be set in the control module 220 (e.g. 150 ml/min) and the control module 220 provides an alarm and/or the control module 220 stops the beverage system in order to prevent that ice crystals would be formed inside the heat exchanger 140, thereby blocking the water flow and damaging the tubes and ports of the beverage system.

It may further be desired (in a particular non-limiting embodiment) that the control module 220 decreases the compressor power of the compressor 180 and/or the ventilating power of the ventilator 200, in case the temperature measured by the first temperature sensor 150 is below a predetermined temperature (e.g. in a range between 2° C. and 10° C., such as (but not limited to) between 4° C. and 7° C. or between 5° C. and 6° C.). Thereby, a "none-freezing safety control" can be provided ensuring that no ice forming may occur in the heat exchanger which can damage the heat exchanger 140.

As a result, the presently disclosed and/or claimed inventive concept(s) provides a small automatic on-demand beverage system which can prepare real fresh cold drinks from water at ambient temperature in a very rapid manner (e.g. in less than 3 minutes). Moreover, the cold water temperature, the flowrate and the quantity of the beverage system can be varied and programmed easily for optimal consumption for different beverages.

It should be clear to a skilled person that the above-shown embodiment is a particular, non-limiting embodiment but that, however, also different cooling means, valve means, or water supply means can be used as long as the valve means are such provided that water coming from the cooling means can be looped back to a position upstream of the cooling means such that the water can be further cooled by the cooling means.

The invention claimed is:

1. A beverage machine comprising:

a beverage system for providing a beverage, and a mixing chamber configured for receiving beverage ingredients;

wherein the beverage system comprises:

a water supply for providing water;

a cooler for cooling the water provided by the water supply, wherein the cooler is downstream of the water supply;

a dispenser configured for dispensing the beverage, wherein the dispenser is downstream of the cooler;

a flowmeter configured for measuring a water flowrate, wherein the flowmeter is downstream of the water supply and upstream of the cooler;

a controller; and a valve member being downstream of the cooler and upstream of the dispenser, wherein the valve member is controlled by the controller, and the controller operates the valve member based on either a sensed temperature of the water or a predetermined period of time to direct water from the cooler either (i) in a loop back to the cooler via a position upstream of the flowmeter and downstream of the water supply for a further cooling of the water, or (ii) to the dispenser for dispensing the cooled beverage;

wherein the valve member comprises a three-way valve including a single inlet, wherein the single inlet is configured to receive the water cooled by the cooler only; and wherein the beverage system is configured to provide the water cooled by the cooler to the valve member without dividing the water prior to the valve member;

wherein the cooler comprises a cooling circuit comprising at least a condenser, a heat exchanger, a compressor, and a throttle device which is arranged between the condenser and the heat exchanger; and wherein the cooler has at least one of the following configurations:

(i) at least one of the condenser or the heat exchanger is selected from the group consisting of a micro channel heat exchanger, a plate heat exchanger, an adiabatic wheel heat exchanger, a plate fin heat exchanger, a pillow plate heat exchanger, a direct contact heat exchanger, and a spiral heat exchanger; or (ii) the compressor is selected from the group consisting of a rotary compressor, an eccentric compressor, a piston compressor, and a linear compressor.

2. The beverage machine according to claim 1, wherein the controller operates the valve member based on the sensed temperature of the water.

3. The beverage machine according to claim 2, wherein the sensed temperature of the water is measured by a first temperature sensor upstream of the valve member and at a water outlet of the cooler.

4. The beverage machine according to claim 3, wherein the cooling circuit comprises a refrigerant selected from the group of 1,1,1,2-tetrafluoroethane ("R134a"), 2-methylpropene ("R600a"), propane ("R290"), monochlorodifluoromethane ("R22") or carbon dioxide ("R744") or a mixture thereof.

5. The beverage machine according to claim 1, wherein the water supply comprises a water tank and/or a connection configured for connecting the beverage system to a water pipe.

6. The beverage machine according to claim 1, further comprising a pump arranged downstream of the flowmeter and configured to provide adjustable pump outputs.

7. The beverage machine according to claim 6, wherein the controller is configured to control the adjustable pump outputs of the pump, based on the water flowrate measured by the flowmeter, such that a predetermined constant water flowrate is provided.

8. The beverage machine according to claim 7, wherein the controller is adapted to provide an alarm signal and/or to stop the beverage system in case the water flowrate is below a predetermined minimum flowrate, wherein the predetermined minimum flowrate is in a range between 80 ml/min and 250 ml/min.

9. The beverage machine according to claim 1, wherein the condenser comprises a ventilator for cooling a refrigerant in the condenser, wherein the ventilator is configured to provide adjustable ventilation power controlled by the controller.

10. The beverage machine according to claim 9, wherein the controller is adapted to reduce a compression power of the compressor and/or the adjustable ventilation power of the ventilator when a first temperature sensor detects a temperature below a predetermined minimum temperature, wherein the predetermined minimum temperature is in a range between 2° C. and 10° C.

11. The beverage machine according to claim 1, wherein the beverage machine comprises a brewing module configured to receive a capsule and/or a pad containing beverage ingredients for beverage preparation.

12. The beverage machine according to claim 1, wherein the mixing chamber is configured for receiving the beverage ingredients dosed from a storage reservoir.

13. The beverage machine according to claim 9, wherein the beverage system further comprises an environmental temperature sensor configured for measuring environmental temperature, and wherein the controller is configured to control the adjustable ventilation power of the ventilator based on the environmental temperature.

14. A beverage system for providing a cooled beverage, the beverage system comprising:

a water supply for providing water;

a cooler for cooling the water provided by the water supply, wherein the cooler is downstream of the water supply;

a dispenser configured for dispensing the cooled beverage, wherein the dispenser is downstream of the cooler;

a flowmeter configured for measuring a water flowrate, wherein the flowmeter is downstream of the water supply and upstream of the cooler;

a controller; and a valve member being downstream of the cooler and upstream of the dispenser, wherein the valve member is controlled by the controller, and the controller operates the valve member based on either a sensed temperature of the water or a predetermined period of time to direct water from the cooler either (i) in a loop back to the cooler via a position upstream of the flowmeter and downstream of the water supply for a further cooling of the water, or (ii) to the dispenser for dispensing the cooled beverage;

wherein the valve member comprises a three-way valve including a single inlet, wherein the single inlet is configured to receive the water cooled by the cooler only; and wherein the beverage system is configured to provide the water cooled by the cooler to the valve member without dividing the water prior to the valve member;

wherein the cooler comprises a cooling circuit comprising at least a condenser, a heat exchanger, a compressor, and a throttle device which is arranged between the condenser and the heat exchanger; and wherein the cooler has at least one of the following configurations:

(i) at least one of the condenser or the heat exchanger is selected from the group consisting of a micro channel heat exchanger, a plate heat exchanger, an adiabatic wheel heat exchanger, a plate fin heat exchanger, a pillow plate heat exchanger, a direct contact heat exchanger, and a spiral heat exchanger; or (ii) the compressor is selected from the group consisting of a rotary compressor, an eccentric compressor, a piston compressor, and a linear compressor; and wherein the compressor is configured to provide adjustable compression power controlled by the controller.

15. The beverage system according to claim 14, wherein the beverage system further comprises an environmental temperature sensor configured for measuring environmental temperature, and wherein the controller is configured to control the adjustable compression power of the compressor based on the environmental temperature.

16. A beverage system for providing a cooled beverage, the beverage system comprising:

a water supply for providing water;

a cooler for cooling the water provided by the water supply, wherein the cooler is downstream of the water supply;

a dispenser configured for dispensing the cooled beverage, wherein the dispenser is downstream of the cooler;

a flowmeter configured for measuring a water flowrate, wherein the flowmeter is downstream of the water supply and upstream of the cooler;

a controller; and a valve member being downstream of the cooler and upstream of the dispenser, wherein the valve member is controlled by the controller, and the controller operates the valve member according to predetermined time patterns to direct water from the cooler either (i) in a loop back to the cooler via a position upstream of the flowmeter and downstream of the water supply for a further cooling of the water, or (ii) to the dispenser for dispensing the cooled beverage, wherein the predetermined time patterns are stored in a memory of the controller;

wherein the valve member comprises a three-way valve including a single inlet, wherein the single inlet is configured to receive the water cooled by the cooler only; and wherein the beverage system is configured to provide the water cooled by the cooler to the valve member without dividing the water prior to the valve member;

wherein the cooler comprises a cooling circuit comprising at least a condenser, a heat exchanger, a compressor, and a throttle device which is arranged between the condenser and the heat exchanger; and wherein the cooler has at least one of the following configurations:

(i) at least one of the condenser or the heat exchanger is selected from the group consisting of a micro channel heat exchanger, a plate heat exchanger, an adiabatic wheel heat exchanger, a plate fin heat exchanger, a pillow plate heat exchanger, a direct contact heat exchanger, and a spiral heat exchanger; or (ii) the compressor is selected from the group consisting of a rotary compressor, an eccentric compressor, a piston compressor, and a linear compressor.

* * * * *